(12) United States Patent
O'Grady (10) Patent No.: US 10,889,771 B2
(45) Date of Patent: Jan. 12, 2021

(54) WASTE-TO-ENERGY CONVERSION SYSTEM

(71) Applicant: PREMIER GREEN ENERGY HOLDINGS LIMITED, Thurles (IE)

(72) Inventor: Seán O'Grady, Thurles (IE)

(73) Assignee: Premier Green Energy Holdings Limited, Thurles (IE)

( * ) Notice: Subject to any disclaimer, the term of this patent is extended or adjusted under 35 U.S.C. 154(b) by 142 days.

(21) Appl. No.: 16/090,782

(22) PCT Filed: Apr. 4, 2017

(86) PCT No.: PCT/EP2017/057978
§ 371 (c)(1),
(2) Date: Oct. 2, 2018

(87) PCT Pub. No.: WO2017/174574
PCT Pub. Date: Oct. 12, 2017

(65) Prior Publication Data
US 2019/0119588 A1 Apr. 25, 2019

(30) Foreign Application Priority Data

Apr. 5, 2016 (EP) ................................... 16163814
Apr. 5, 2016 (EP) ................................... 16163815

(51) Int. Cl.
*C10K 3/00* (2006.01)
*C10J 3/00* (2006.01)
(Continued)

(52) U.S. Cl.
CPC ............. *C10K 3/008* (2013.01); *C10B 47/30* (2013.01); *C10B 53/00* (2013.01); *C10J 3/005* (2013.01);
(Continued)

(58) Field of Classification Search
CPC ......... C10K 3/008; F23G 5/0273; F23G 5/20; F23G 5/16; F23G 2202/103;
(Continued)

(56) References Cited

U.S. PATENT DOCUMENTS 4,347,119 A * 8/1982 Thomas .................... C10B 7/00
201/15
4,412,889 A * 11/1983 Oeck ....................... C10B 47/44
202/117
(Continued)

FOREIGN PATENT DOCUMENTS

DE 42 37 161 A1 5/1994

OTHER PUBLICATIONS

International Search Report issued in PCT/EP2017/057978; dated Jun. 30, 2017.
(Continued)

*Primary Examiner* — David J Laux
(74) *Attorney, Agent, or Firm* — Studebaker & Brackett PC (57) ABSTRACT

A pyrolysis waste-to-energy conversion system has a muffle furnace housing a rotating retort drum within the furnace and having an inlet sleeve and an outlet sleeve extending through inlet and outlet ends of the muffle furnace. A rotating retort drum drive applies rotary drive to the inlet rotating retort drum sleeves and an in-feed auger is within a tube within the inlet sleeve. An out-feed auger is within a tube within the outlet sleeve and arranged to deliver char and pyrolysis syngas to a char processing system and a syngas processing system. The inlet sleeve and said outlet sleeve are arranged to provide a gas seal to prevent air ingress or syngas egress to and from the rotating retort drum. A gas
(Continued)

cleaning system has a cracking tower arranged to retain inlet gas at an elevated temperature for a residence time, and a gas quench and scrubber system.

16 Claims, 9 Drawing Sheets

(51) Int. Cl.
| | |
|---|---|
| *C10B 47/30* | (2006.01) |
| *C10B 53/00* | (2006.01) |
| *F23G 5/027* | (2006.01) |
| *F23G 5/20* | (2006.01) |
| *F23G 5/16* | (2006.01) |
| *F23L 1/00* | (2006.01) |
| *C10J 3/64* | (2006.01) |

(52) U.S. Cl.
CPC .............. *C10J 3/64* (2013.01); *F23G 5/0273* (2013.01); *F23G 5/16* (2013.01); *F23G 5/20* (2013.01); *F23L 1/00* (2013.01); *C10J 2300/0946* (2013.01); *F23G 2201/301* (2013.01); *F23G 2201/303* (2013.01); *F23G 2202/103* (2013.01); *F23G 2203/208* (2013.01); *F23G 2205/12* (2013.01); *F23J 2700/003* (2013.01)

(58) Field of Classification Search
CPC ......... F23G 2201/303; F23G 2201/301; F23G 2203/208; C10J 3/64; C10J 3/005; C10J 2300/0946; C10B 47/30; C10B 53/00
See application file for complete search history.

(56) References Cited

U.S. PATENT DOCUMENTS

| | | | | |
|---|---|---|---|---|
| 6,084,139 | A * | 7/2000 | Van Der Giessen | ... C10B 53/00 585/240 |
| 6,178,899 | B1 * | 1/2001 | Kaneko | ............ B01D 53/34 110/204 |
| 8,833,276 | B2 * | 9/2014 | Bang | ................. F23G 5/16 110/257 |
| 9,052,109 | B1 * | 6/2015 | Fowler | ................ F23G 5/444 |
| 9,605,210 | B2 * | 3/2017 | Tucker | ................ C10B 53/02 |
| 2005/0039651 | A1 * | 2/2005 | Cole | ................. C10B 53/00 110/341 |
| 2007/0186829 | A1 * | 8/2007 | Cole | ................. C10B 47/44 110/229 |
| 2010/0288618 | A1 * | 11/2010 | Feerer | ............... C10B 53/00 202/118 |

OTHER PUBLICATIONS

International Preliminary Report on Patentability issued in PCT/EP2017/057978; dated Oct. 9, 2018; 7 pp.

* cited by examiner

WASTE-TO-ENERGY CONVERSION SYSTEM

INTRODUCTION

Field of the Invention

The invention relates to a pyrolysis retort system.

It is known to provide a pyrolysis retort system which heats a feedstock in an anaerobic atmosphere, thereby providing a syngas product. The syngas product may be utilised to provide liquid or gaseous hydrocarbon products.

An object of the invention is to provide such a retort system which is compact, more energy efficient, offers improved heat transfer for feedstock, and/or which can be utilised to convert a wider range of feedstock to syngas.

SUMMARY OF THE INVENTION

We describe a pyrolysis conversion system comprising a muffle furnace, and a rotating retort drum within the furnace and having an inlet sleeve and an outlet sleeve (66) extending through inlet and outlet ends of the muffle furnace, and a rotating retort drum drive applying rotary drive to at least one of said rotating retort drum sleeves. There may be an in-feed auger within a tube within the inlet sleeve, and an out-feed auger within a tube within the outlet sleeve and arranged to deliver char and pyrolysis syngas to a char processing system and a syngas processing system. The latter preferably comprises a cracking tower arranged to retain inlet gas at an elevated temperature for a residence time, and a gas quench and scrubber system.

The cracking tower may comprise a mixing chamber linked with and upstream of a residence chamber. The mixing chamber may comprise a burner for heat generation and an oxidant port arranged to mix and partially consume a portion of the gas as it passes through the mixing chamber.

The mixing chamber is preferably linked to the residence chamber by a choke ring having a central aperture, and the burner is configured to direct a flame through the mixing chamber and into the choke ring aperture.

The mixing chamber gas inlet is preferably tangential into the chamber. Preferably, the residence chamber has a length in the range of 2 m to 8 m, and a lateral dimension in the range of 1 m to 2 m.

The system preferably further comprises a pump downstream of the gas cleaning system, and a controller adapted to control operation of the pump to maintain pressure in the system to achieve a desired residence time and pressure of gas in the cracking tower for desired hydrocarbon cracking without residue deposits.

The controller is preferably adapted to maintain a pressure within the retort drum in the range of −10 mBar to +10 mBar, preferably −5 mBar to 0 mBar.

The gas quench and scrubber system preferably comprises a Venturi quench throat and cyclonic spray nozzles. The nozzles preferably comprise low pressure nozzles and high pressure nozzles, and may be cyclonic. Preferably, the scrubber system comprises a spray bar within, and preferably centrally within, a conduit. The gas quench and scrubber system preferably comprises a tank and a pump for drawing liquid from a sump of a scrubber column.

Preferably, the system comprises a conduit for delivering a portion of the cleaned gas to nozzles for heating the rotating drum. Preferably, said inlet sleeve is arranged to provide a gas seal to prevent air ingress or syngas egress to and from the rotating retort drum. Preferably, the rotating retort drum has auger scroll blades fixed to the rotating retort drum wall for conveying feedstock along the drum towards the outlet. Preferably, the rotating retort drum comprises scroll blades of opposite direction for reversal of char movement from and end of the drum and into the outlet auger. Preferably, the rotating retort drum comprises at least one char pick-up scoop.

The rotating retort drum may comprise longitudinally-separated barriers between which are radial char retainers for delivery of char into an outlet auger.

Preferably, there is a rotary drive for the inlet sleeve, preferably comprising a rotary bearing adjacent the muffle furnace and a gear drive at a location further from the muffle furnace.

The in-feed auger tube may be surrounded by a cooling jacket for at least some of its length. The cooling jacket may comprise an expansion bellows arranged to accommodate mutual axial expansion and contraction between the rotating retort drum (4) when rotating and stationary parts of the in-feed auger.

Preferably, the system comprises a hopper mounted over the in-feed auger and extending through an upper opening in the in-feed auger tube.

Preferably, said hopper is arranged to block a potential syngas escape path while the hopper is full.

The system may comprise interlocking gate valves or a rotary valve for feeding said hopper. Preferably, the in-feed auger is driven by a motor on a side of the hopper distal from the rotating retort drum. Preferably, the out-feed auger is surrounded by a tube having an opening over a hopper for char gravity fall, and an opening for a syngas flow path into an upper conduit for delivery of syngas to syngas processing system.

Preferably, the out-feed auger tube has a char outlet opening on its lower side, which allows char and solid particulate to fall and occupy a lower part of an out-feed hopper, and in which syngas occupies any free volume remaining in the hopper, and the system comprises a syngas extraction system arranged to extract syngas from the hopper under negative pressure.

The system may further comprise a syngas burner within the muffle furnace for heating an annular space around the rotating retort drum, and a feedback link for directing syngas from the rotating retort drum back to said burner.

Preferably, the system further comprises a burner for burning residual syngas in the muffle furnace and driving a heat exchanger to recover heat.

Preferably, said hopper is linked with a char recovery unit of the system.

Preferably, the system comprises a pump downstream of the gas cleaning system, and a controller to control the pump according to pressure-sensing signals from within the retort, and/or a gas outlet, and the cracking tower to ensure that the pressure generated in the retort by conversion of solid mass feedstock to gas is capped at a level which does not become excessive and also controls the residence time in the cracking tower.

Preferably, the controller is configured to control said pump to provide a cracking tower residence time in the range of 1 second to 4 seconds.

We also describe a pyrolysis conversion method performed by a conversion system of any embodiment, the method comprising feeding feedstock into the retort drum via the inlet sleeve in-feed auger, rotating the retort drum and heating it within the muffle furnace so that the feedstock is pyrolised within the retort drum, feeding char and gas out through the out-feed auger, and cracking the gas in the cracking tower.

Preferably, the gas is heated in the cracking tower to a temperature in the range of 850° C. to 1250° C., and is subsequently cooled by the gas quench and scrubber system. Preferably, the feedstock is heated in the retort drum at a temperature in the range of 550° C. and 700° C. Preferably, the residence time within the cracking tower is in the range of 1 sec to 4 sec.

Preferably, the cracking tower residence time is controlled by control of a gas pump downstream of the cracking tower. Preferably, the pressure within the retort drum is maintained at a value in the range of −10 mBar to +10 mBar, preferably −5 mBar to 0 mBar. Preferably, said retort drum pressure is controlled by control of a gal pump downstream of the cracking tower.

Additional Statements

According to the invention, there is provided a pyrolysis conversion system comprising:
- a muffle furnace,
- a rotating retort drum within the muffle furnace and having an inlet sleeve and an outlet sleeve extending through inlet and outlet ends of the muffle furnace;
- a rotating retort drum drive applying rotary drive to at least one of said rotating retort drum sleeves,
- an in-feed auger within a tube within the inlet sleeve, and
- an out-feed auger within a tube within the outlet sleeve and arranged to deliver char and pyrolysis syngas to a char processing system and a syngas processing system.

In one embodiment, said inlet sleeve and said outlet sleeve are arranged to provide a gas seal to prevent air ingress or syngas egress to and from the drum.

In one embodiment, the rotating retort drum has an auger scroll fixed to the drum wall. In one embodiment, the rotating retort drum comprises flights for delivery of char into the outlet auger. In one embodiment, the rotating retort drum comprises at least one pick-up scoop.

In one embodiment, the system comprises final flight helical blades that have a reverse direction with respect to an auger scroll, arranged to allow for collection of char to accumulate at a single radial position on the rotating retort drum.

In one embodiment, the rotating retort drum drive applies rotary drive to the inlet sleeve.

In one embodiment, the rotating retort drum drive comprises a rotary bearing adjacent the muffle furnace and a gear drive at a location further from the muffle furnace.

In one embodiment, the in-feed auger tube is surrounded by a cooling jacket for at least some of its length.

In one embodiment, the cooling jacket comprises an expansion bellows arranged to accommodate mutual axial expansion and contraction between the rotating retort drum when rotating and stationary parts of the in-feed auger.

In one embodiment, the system further comprises a hopper mounted over the in-feed auger and extending through an upper opening in the in-feed auger tube. Preferably, said hopper blocks a potential syngas escape path while the hopper is full. In one embodiment, the system further comprises interlocking gate valves feeding said hopper.

In one embodiment, the in-feed auger is driven by a motor on a side of the hopper distal from the rotating retort drum.

In one embodiment, the out-feed auger is surrounded by a tube having an opening over a hopper for char gravity fall, and an opening for a syngas flow path into an upper conduit for delivery of syngas to syngas processing system.

In one embodiment, the out-feed auger tube has a char outlet opening on its lower side, which allows char and solid particulate to fall and occupy a lower part of an out-feed hopper, and in which syngas occupies any free volume remaining in the hopper, and the system comprises a syngas extraction system arranged to extract syngas from the hopper under negative pressure.

In one embodiment, the system further comprises a syngas burner within the muffle furnace for heating the rotating retort drum, and a feedback link for directing syngas from the drum back to said burner.

In one embodiment, the system further comprises a burner for burning residual syngas in the muffle furnace and driving a heat exchanger to recover heat.

Preferably, said hopper is linked with a char recovery unit of the system.

According to the invention, there is provided a gas cleaning system comprising:
- a cracking tower arranged to retain inlet gas at an elevated temperature for a residence time, and a gas quench and scrubber system.

In one embodiment, the cracking tower comprises a mixing chamber linked with a residence chamber.

In one embodiment, the mixing chamber is above the residence chamber.

In one embodiment, the mixing chamber comprises a burner for heat generation and an oxidant port arranged to mix and partially consume a portion of the gas as it passes through the chamber.

In one embodiment, the mixing chamber is linked to the residence chamber by a choke ring having a central aperture. In one embodiment, the burner is configured to direct a flame through the mixing chamber and into the choke ring aperture.

In one embodiment, the mixing chamber gas inlet is tangential into the chamber. In one embodiment, the residence chamber stores media creating a circuitous gas path.

In one embodiment, the media have a high surface area for contact with the syngas. In one embodiment, the media comprise cylindrical bodies. In one embodiment, the media are of ceramic material. Preferably, the residence chamber is arranged to draw gas through the media from outside to inside.

In one embodiment, the media are supported on a filter.

In one embodiment, the system comprises a media cleaning sub-system.

In one embodiment, the media cleaning sub-system comprises a reverse jet pulse nozzle for causing accumulated solids to be detached from outer surfaces of the media.

In one embodiment, the cracking tower comprises a steam injection system for injecting steam into the residence chamber, preferably through apertures incorporated into a choke ring.

In one embodiment, the gas quench and scrubber system comprises a Venturi quench throat and cyclonic spray nozzles.

In one embodiment, the nozzles comprise low pressure nozzles and high pressure nozzles.

In one embodiment, the nozzles are cyclonic nozzles.

In one embodiment, the scrubber system comprises a spray bar within, and preferably centrally within, a conduit.

In one embodiment, the gas quench and scrubber system comprises a tank and a pump for drawing liquid from a sump of a scrubber column.

In another aspect, the invention provides a treatment system comprising a pyrolysis retort for providing gas at an outlet, and a gas treatment system of any embodiment arranged to remove contaminants from pyrolysis gas from the retort.

In one embodiment, the retort comprises a static insulating shell, and a rotating drum rotating about its longitudinal axis within the shell.

In one embodiment, the drum has an on-axis inlet sleeve and an on-axis outlet sleeve, a feedstock inlet auger within the drum inlet sleeve and a gas and char outlet auger within the drum outlet sleeve.

In one embodiment, the system comprises a conduit for delivering a portion of the cleaned gas to nozzles for heating the rotating drum.

DETAILED DESCRIPTION OF THE INVENTION

Brief Description of the Drawings

The invention will be more clearly understood from the following description of some embodiments thereof, given by way of example only with reference to the accompanying drawings in which: —

DESCRIPTION OF THE EMBODIMENTS

Figure 1:
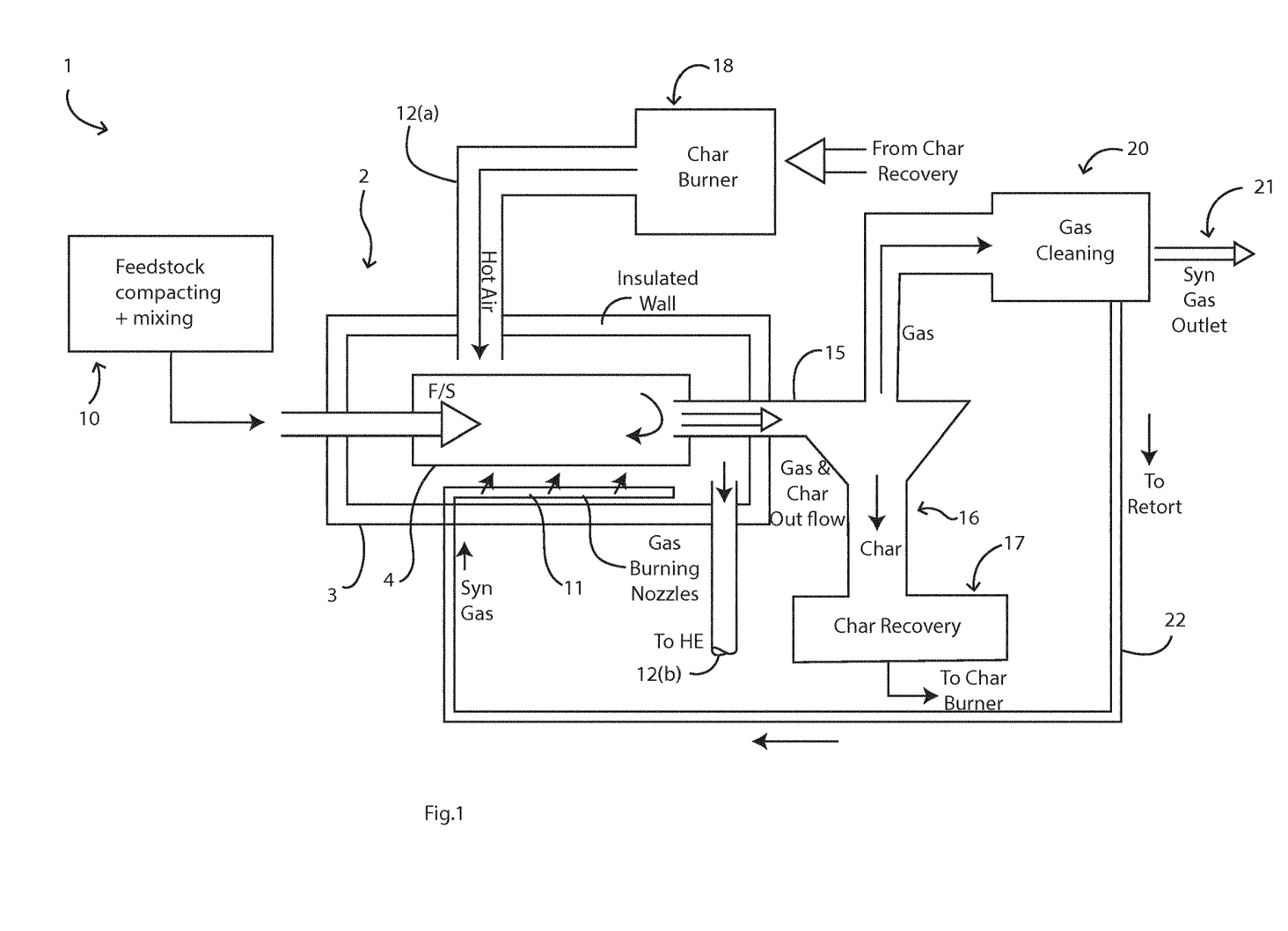
FIG. 1 is an overview diagram of a waste-to-energy conversion system of the invention.

Referring to FIG. 1 a waste-to-energy conversion system 1 comprises the following:
- a conversion chamber 2, comprising a static insulating shell or "muffle furnace" 3 of generally cylindrical shape and a rotating retort drum 4 rotating about its longitudinal axis within the shell 3;
- a feedstock inlet system 10;
- syngas-burning nozzles 11 within the shell 3, for heating the rotating retort drum 4 and its contents;
- a hot flue exhaust gases conduit 12(a), also for heating the rotating retort drum 4 by delivering hot flue exhaust gases into the annulus space between the muffle furnace shell 3 and the rotating retort drum, and an outlet 12(b) for these gases;
- a combined syngas and char outlet 15;
- a char hopper 16, linked to a char recovery system 17;
- a char burner 18 receiving char from the char recovery system 17, and delivering the resultant hot flue exhaust gases via the conduit 12 (a) to within the muffle furnace 3 as described above;
- a syngas cleaning system 20 for receiving pyrolysis syngas from the rotating retort drum 4 via the conversion chamber outlet 15 to provide cleaned syngas product at an outlet 21 for the overall waste-to-energy conversion system 1;
- a conduit 22 for delivering a portion of the syngas from the syngas cleaning system 20 to the nozzles 11 for heating the rotating retort drum 4.

The process plant 1 is for the production of bio-energy and bio-refined chemicals, polymers and fuels and operates on the principle of pyrolysis, a thermal process in which materials thermally decompose in the absence of oxygen.

Figure 2:
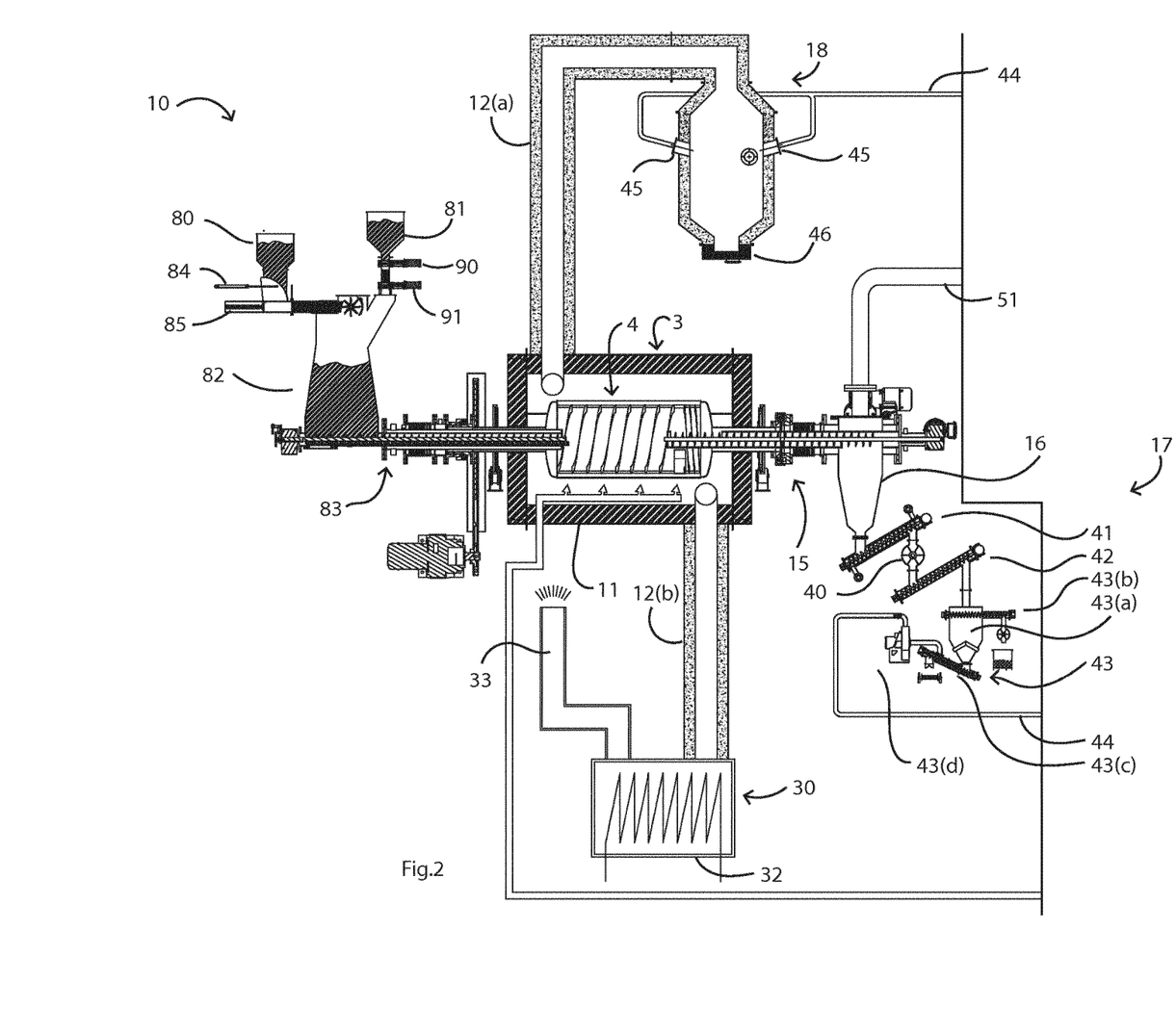
FIG. 2 is a more detailed view of a portion of the system including a feedstock inlet, a rotating retort drum, and a gas outlet.

Referring to FIG. 2, the feedstock inlet 10 comprises:
- a hopper feed 80 for low-density feedstock;
- a hopper feed 81 for high density feedstock;
- a main hopper 82;
- an inlet auger system 83.

The hopper feed 80 has a pre-compaction closing device 84, and a plunger 85 for compacting feedstock. The hopper 81 has gate valves 90 and 91, allowing a quantity of feedstock to be dropped into an interlock arrangement. Both of the feed hoppers 80 and 81 deliver into the main hopper 82, from which the auger system 83 draws the feedstock and delivers it into the rotating retort drum 4, via the rotating retort drum inlet 65, as illustrated in more detail in FIGS. 3 to 5.

A heat exchange system 30 has the conduit 12(b), for extracting heated flue exhaust gases from the annulus between the muffle furnace shell 3 and the rotating retort drum 4, a heat exchanger 32, and a flue 33. This extracts valuable heat from the gases used to heat the rotating retort drum 4.

The char recovery system 17 comprises the hopper 16, and a series of two inclined augers 41 and 42 linked by a rotary seal valve 40. The lower auger 42 is linked at its output to a secondary char hopper system 43 comprising:
- a hopper 43(a);
- a high level extract auger 43(b) having a rotary valve at its outlet;
- a third inclined auger 43(c) at the outlet of the secondary hopper 43(a);
- a pneumatic char delivery fan 43(d).

A pipe 44 delivers char under pneumatic transfer action to the char burner 18. The char burner 18 has a pair of tangentially-directed char inlets 45, and a lower gate 46.

Referring again to the conversion chamber outlet 15, this has an auger for combined delivery of syngas and char out of the retort drum 4. It terminates over the primary char hopper 16, so that syngas rises via a conduit 51 for delivery to the syngas cleaning system 20, and char falls under gravity into the hopper 16.

Figures 3, 4, 5:
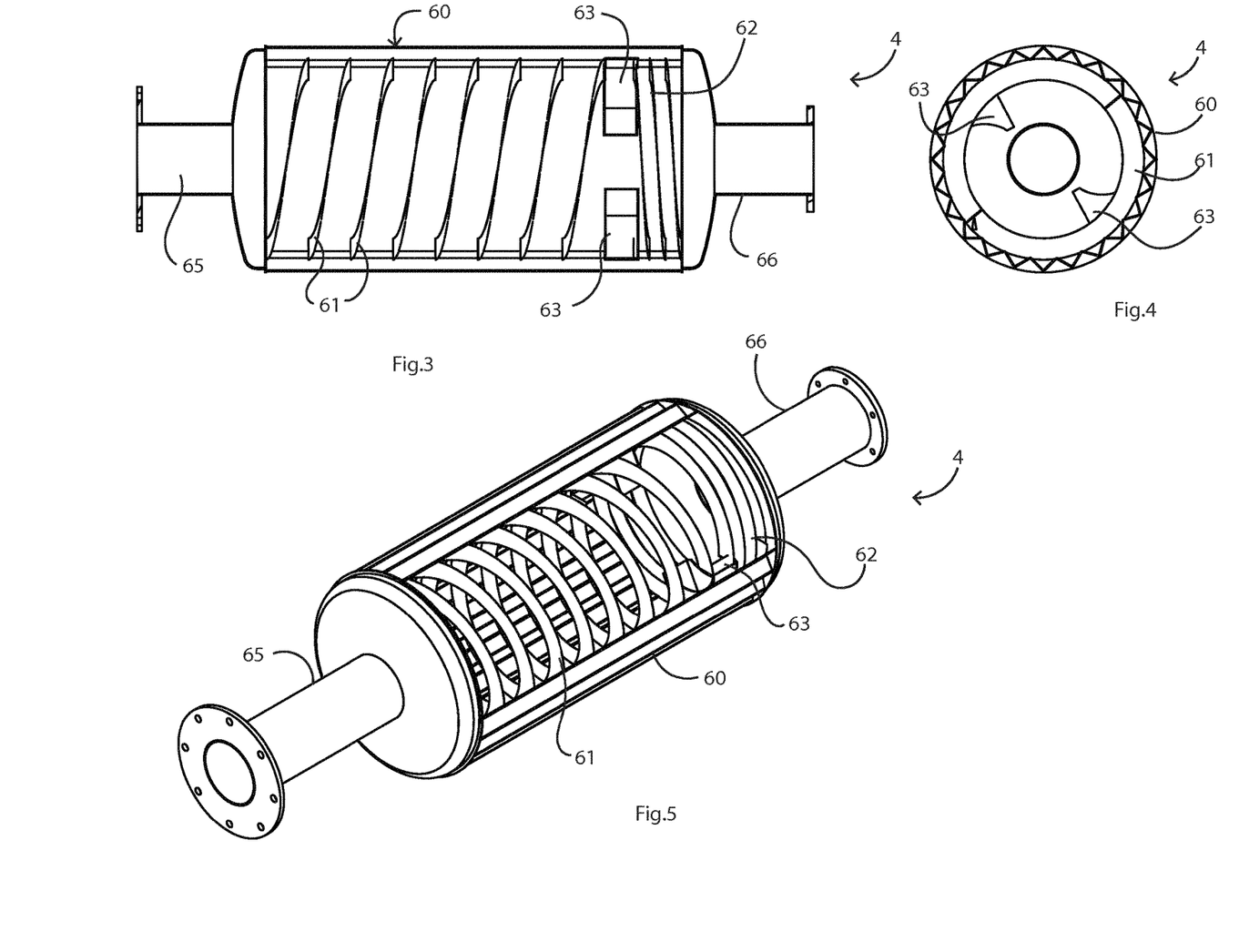
FIGS. 3, 4, and 5 are longitudinal sectional, cross-sectional, and perspective cut-away views of the rotating retort drum.

The rotating retort drum 4, as shown in FIGS. 3 to 5, comprises a cylinder 60, multiple internal helical blades 61 extending inwardly from the cylinder 60 internal surface. There are final flights 62, which are helical blades that are reversed in direction to the flights 61, which allow for the collection of solid material (char and inert material) to accumulate at a single longitudinal position on the rotating retort drum 4, between the flights 61 and 62.

Figure 7:
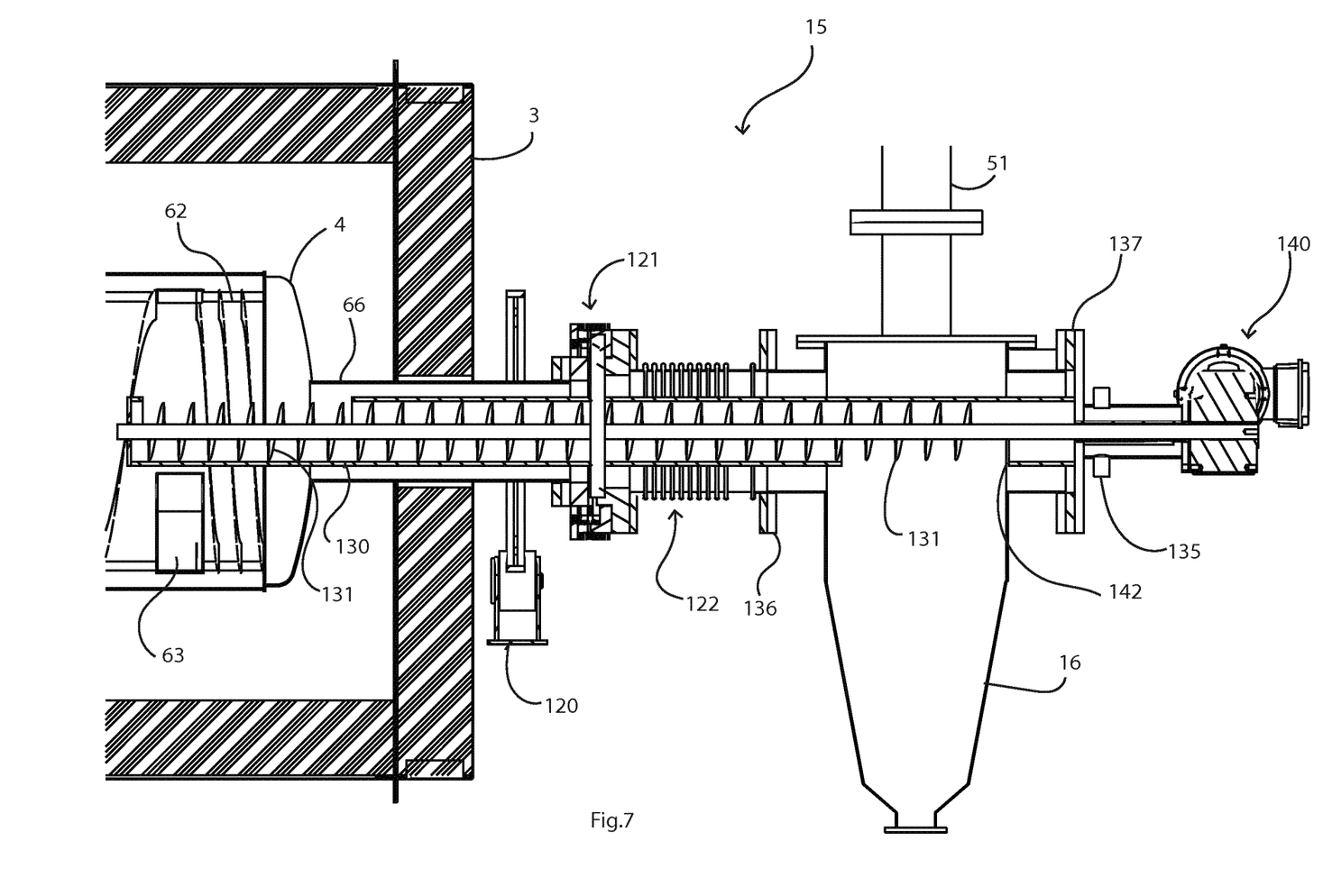

Also, there are multiple pick-up scoops 63 for the solid material to be collected and deposited into an outlet scroll (131) that exits the rotating retort drum, as illustrated in FIG. 7. There is an axial flanged inlet 65 and outlet 66 which allows material delivery into the rotating retort drum 4 and char extract from the vessel whilst maintaining a gas seal to avoid air ingress or syngas egress.

Figure 6:
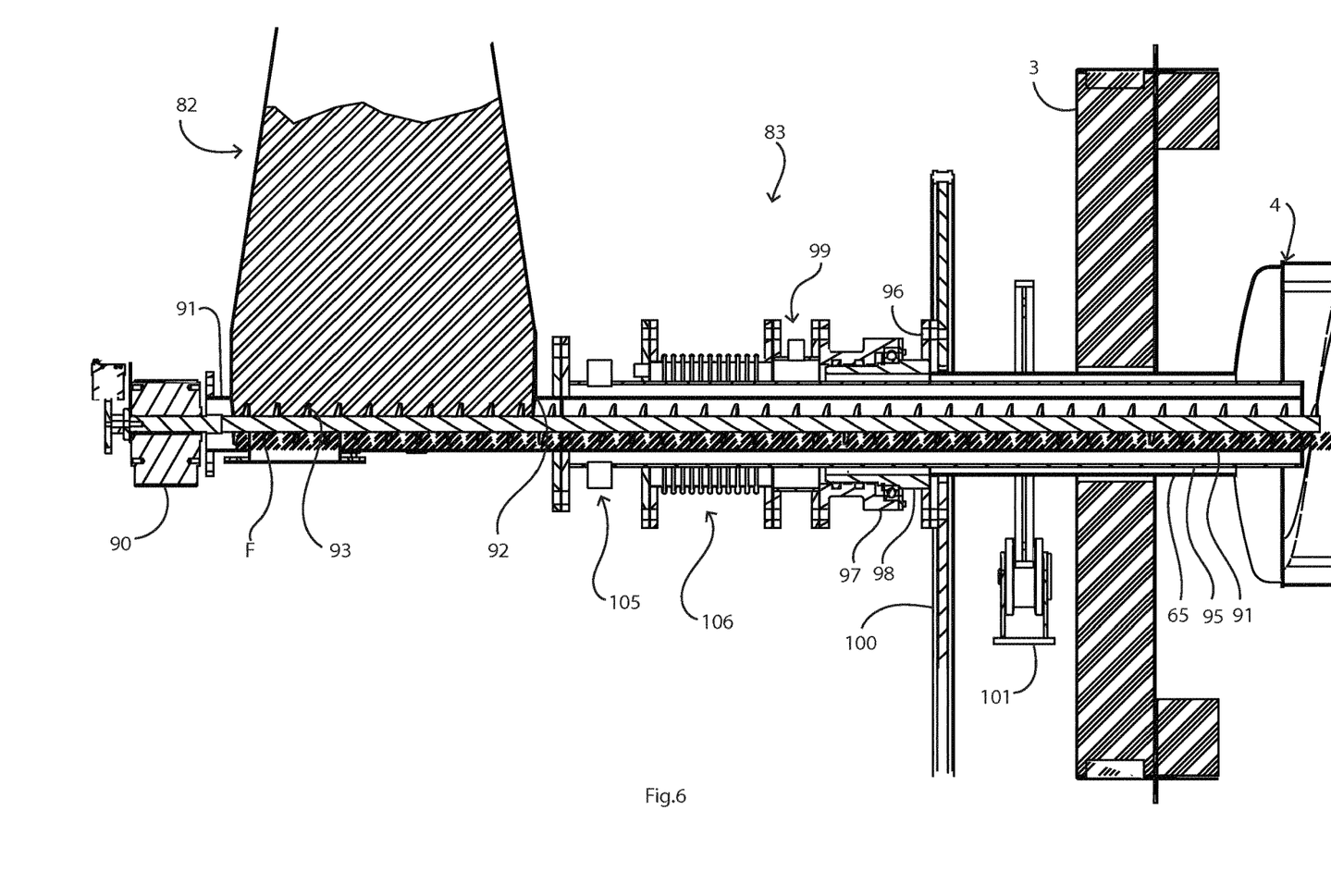
FIGS. 6 and 7 are more detailed cross-sectional views of inlet and outlet rotating retort drum stages, respectively.

Referring to FIG. 6, the in-feed system 83 ensures safe and reliable delivery of feedstock to the rotating retort drum 4, and comprises the following components:

90, in-feed drive motor and gearbox;
91, auger tube, having an access port at the lower side closest to the gearbox,
92, auger tube opening to receive feedstock from the main hopper 82;
93, auger screw or scroll for conveying feedstock F received directly be gravity from the hopper 82;
95, cooling jacket around the auger tube 91;
65, rotating retort drum 4 drive sleeve (see also FIGS. 3 to 5);
96, rotating retort drum drive sleeve flange;
97, a non-rotating fixed annular seal to prevent gas escape and air ingress
98, sleeve rotating with the tube 65, and sealed by the seal 97,
100, drum drive gear train;
101, roller bearing from the rotating retort drum drive sleeve 65, taking the weight of the retort 60 on the inlet side;
105, ports for the water-cooling jacket 95, to maintain the feedstock and the whole inlet auger system 83 cool to avoid premature reactions occurring at this stage;
106, steel bellows for axial expansion and contraction of the jacket 95.

The rotating retort drum 4 is therefore rotated by the drive mechanism 100 applying drive to the rotating retort drum drive sleeve 65 and supported by the bearings 101. The flange 96 allows excellent contact between the drive train 100 and the drive sleeve 65.

Because the auger tube 91 extends into the rotating retort drum 4 the feedstock material is deposited directly onto the outer surface wall 60. This immediately allows the heat to be directly transferred from the hot gases in the space around the rotating drum 4 and via the drum corrugated wall 60 to the feedstock F. This may give rise to an undesirable effect of heat being transferred towards the hopper 82, however this effect is minimised by the cooling jacket arrangement 105 and 95. Moreover, there is a risk of syngas escaping through the feedstock within the auger tube 91. However, the potential syngas escape path is blocked by the hopper 82 being kept full and also by the interlocking gate valves 84, 85, 90, and 91, thereby blocking the outer end of the inlet auger system 83. The bellows 106 accommodates mutual axial expansion and contraction between the rotating retort drum 4 and the stationary parts of the in-feed spigot and auger system.

Referring to FIG. 7 the outlet stage 15 has the rotating retort drum outlet sleeve 66 on bearings 120 and linked via a double ring seal 121 to an expansion bellows 122. This allows axial expansion and contraction, and the bearing 120 takes the weight of this side of the retort 4. The rotating retort drum 4 sleeve 66 encloses an auger tube 130, in turn housing an auger scroll 131. The auger scroll 131 is driven by a motor and gear drive 140 at its outermost end.

The auger tube 130 has a char outlet opening 142 on its lower side, which allows the char and solid particulate to fall and occupy the lower part of the hopper 16. The syngas occupies any free volume remaining in the hopper where it is subsequently extracted under negative pressure through the outlet port 51.

It is to be noted that there is no cooling system between the drum 4 and the hopper 16 and gas conduit 51 because it is desired that the temperatures be high at this stage, for example in the region of 600° C.+/−50° C. This prevents gas from condensing. The gas and char at the outlet of the retort 4 is at a higher temperature, about 700° C.+/−50° C.

There is a water cooling jacket with ports 135 downstream of the hopper 16, to protect the variable speed drive 140.

The fuel feed system 10 ensures uniform input of feedstock into the rotating retort drum 4 without the ingress of air or escape of syngas. This objective is achieved by controlled entry of feedstock through a series of augers and interlocking gate valves. Excluding oxygen prevents combustion of the fuel and ensures that no dioxins can be formed at detectable levels. The fuel feed primary hoppers 80 and 81 act as a buffer mechanism to facilitate material accumulation over the auger 93 and thus ensures that the zone in front of the interlocking gate valves 90 and 91 is always occupied. The vessel is manufactured from carbon steel with a painted surface finish to the exterior. The hopper is mounted in an elevated position to facilitate inclined auger and gate valve alignment and functionality. The level control on the hopper 81 is determined by high and low level sensors detecting fill level. In the event of low level alarm activation the gate valves will not function.

The fuel feed secondary hopper 82 is a trapezoidal shaped temporary storage vessel for the input material prior to feeding it into the rotating retort drum 4 at the appropriate rate and also acts as a buffer zone to allow material to accumulate in front of the rotating retort drum. The in-feed hopper 82 is integrated with the screw 93.

The gate valves 90 and 91 are designed to meet demanding applications when handling a range of feedstock materials ranging from moist organic biomass (to drier non-organic feed-stocks. The valves are mounted in a horizontal position which facilitates gravitational flow of material and delivers a positive material shut-off together with gas tight sealing.

The front end of the in-feed system 10 comprises the in-feed hopper 82 flanged to the in-feed auger 93 and gas seal equipment. The in-feed auger 93 feeds through a central axis where the fuel is delivered into the rotating retort drum 4. The rotational speed of the auger is controlled by the drive mechanism 100 via a gear train 99 and revolutions per minute are monitored.

The in-feed system 10 dual pipe configuration in which the fuel enters on the inner tube 91 and is water cooled on the outer tube 95 is very advantageous. The in-feed auger 93 has a mounted variable speed drive 90 which controls the feed rate of material to the rotating retort drum 4. The auger 93 feeds the material through the central axis of the spigot and the fuel is deposited onto the front section of the rotating retort drum.

The water jacket 95 that surrounds the fuel feed tube 91 ensures that the fuel is not prematurely pyrolysed prior to entry into the rotating retort drum whilst also delivering suitable water cooling effects onto the steel shell of the spigot.

The water jacket 95 flow is controlled by an inline centrifugal pump. The model selected is an industrial close-coupled capable of appropriate water flow to maintain satisfactory heat transfer levels.

The bellows 106 are very effective at accommodating any thermal expansion of the rotating retort drum, providing a suitable rotating retort drum expansion allowance has been incorporated into the design which the bellows pieces facilitate. The in-feed side of the rotating retort drum has minimal expansion capacity due to the roller design which encourages the thermal expansion to occur on the back end bellows 106. As the bellows forms part of the spigot design that is water cooled, the operating temperature on the front end expansion bellows is limited.

The inside of the bellows 106 has the potential to be exposed to syngas derived from selected feedstock materials and therefore will have the potential to contain corrosive gas elements including chlorine and sulphur. The material selection for the bellows along with wall thickness will compensate for the potential presence of these elements.

The gas seals 97 operate effectively as the transitional components between the rotating retort drum 4 tube 65 and the stationary front and rear spigots 98, whilst also absorbing the expansion of the rotating retort drum. Both the front and rear seals are of similar design. Eco-rubber Viton seals are used due to their compatibility with hydrocarbons and their known higher temperature and chemical resistance characteristics. There are two opposed seals to preserve a leak free seal design. The inner seal is arranged to prevent the leakage of syngas from the rotating retort drum to the outside atmosphere under conditions of positive pressure while the outer seal is arranged to prevent the ingress of air from the outside atmosphere into the rotating retort drum under conditions of negative pressure.

Grease packing is provided in the void between the seals to assist seal lubrication. Seal type and profile and material are critical to the design feature. The seal is fitted with a bearing which is provided with its own grease nipple for lubrication.

Feedstock to be pyrolysed is augured into the retort 4 which is devoid of oxygen. Oxygen conditions within the reactor are maintained by controlling an initial purge of the reactor with nitrogen followed by specific control philosophy and system design to eliminate air ingress through the in-feed mechanism.

The muffle furnace 3 cylindrical stainless steel outer shell 3 with refractory lining allows adequate heat transfer to the rotating retort drum 4 from flue exhaust gases. The muffle furnace 3 houses the rotating retort drum 4, which protrudes by the tubes 65 and 66 through both ends of the outer vessel. The muffle furnace 3 allows removal of the end plates, which in turn facilitates access to the external surfaces of the rotating retort drum. This subsequently assists in the event of maintenance requirements.

Alternative Retort Drum

Figure 8:
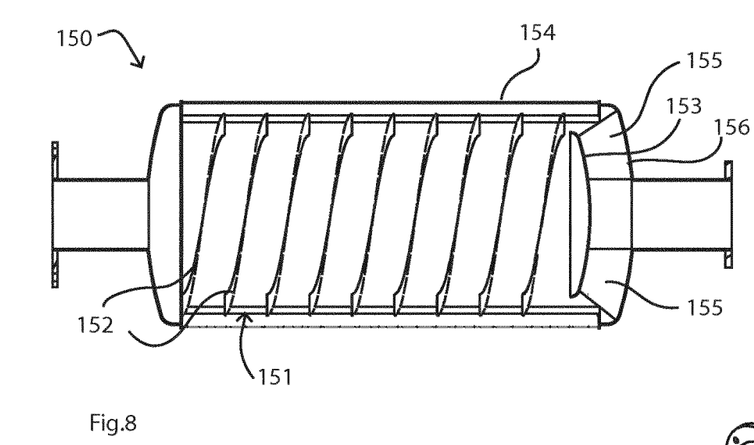
FIGS. 8, 9, and 10 are sectional, cut-away perspective, and cross-sectional views of an alternative retort.
Figure 9:
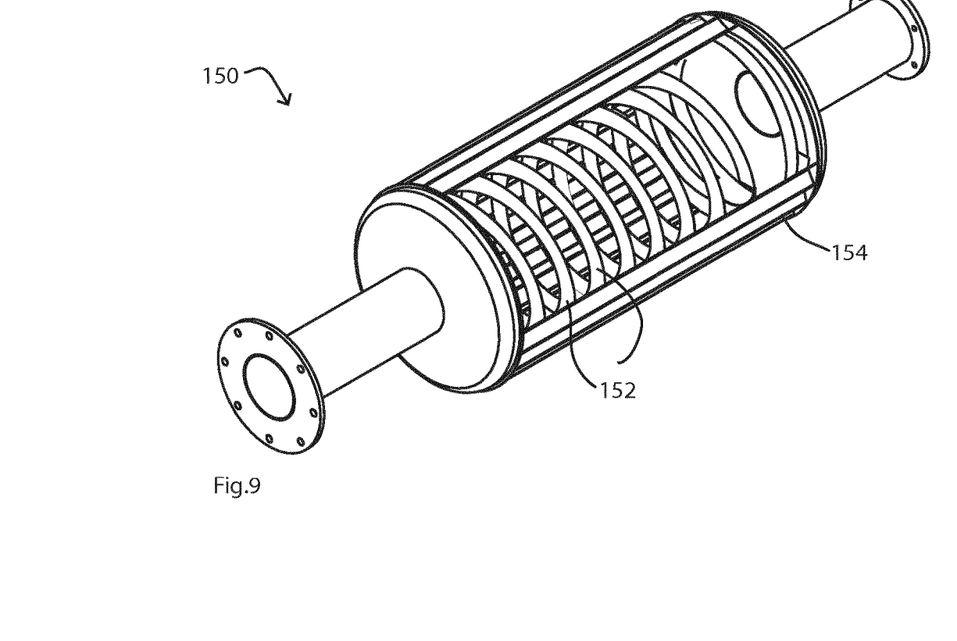
Figure 10:
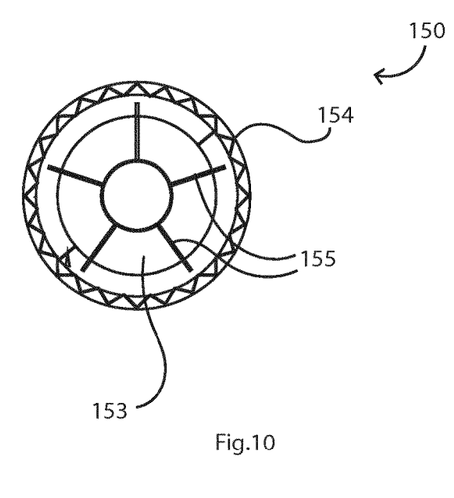

FIGS. 8 to 10 show an alternative retort drum 150 that comprises an outer corrugated shell 151 with internal vanes 152 extending inwardly from the shell 151 and an end dish 156. There is additionally an internal dish 153 for guiding delivery of char out of the drum 150. As for the retort drum 4, the feedstock can have controlled temperature exposure for the optimum period of time, and delivery into the outlet auger is very effective. Radial vanes 155 at the outlet end of the drum 150 effectively drop char which is trapped on the vanes 155 and between the drum 150 end dish 156 and the internal dish 153 onto the auger 131. It has been found that by providing spaced apart barriers (153 and drum 150 end 156) in addition to radial barriers (155) there is very effective entrapment of char and delivery into the outlet auger 131.

Gas Cleaning

Figure 11:
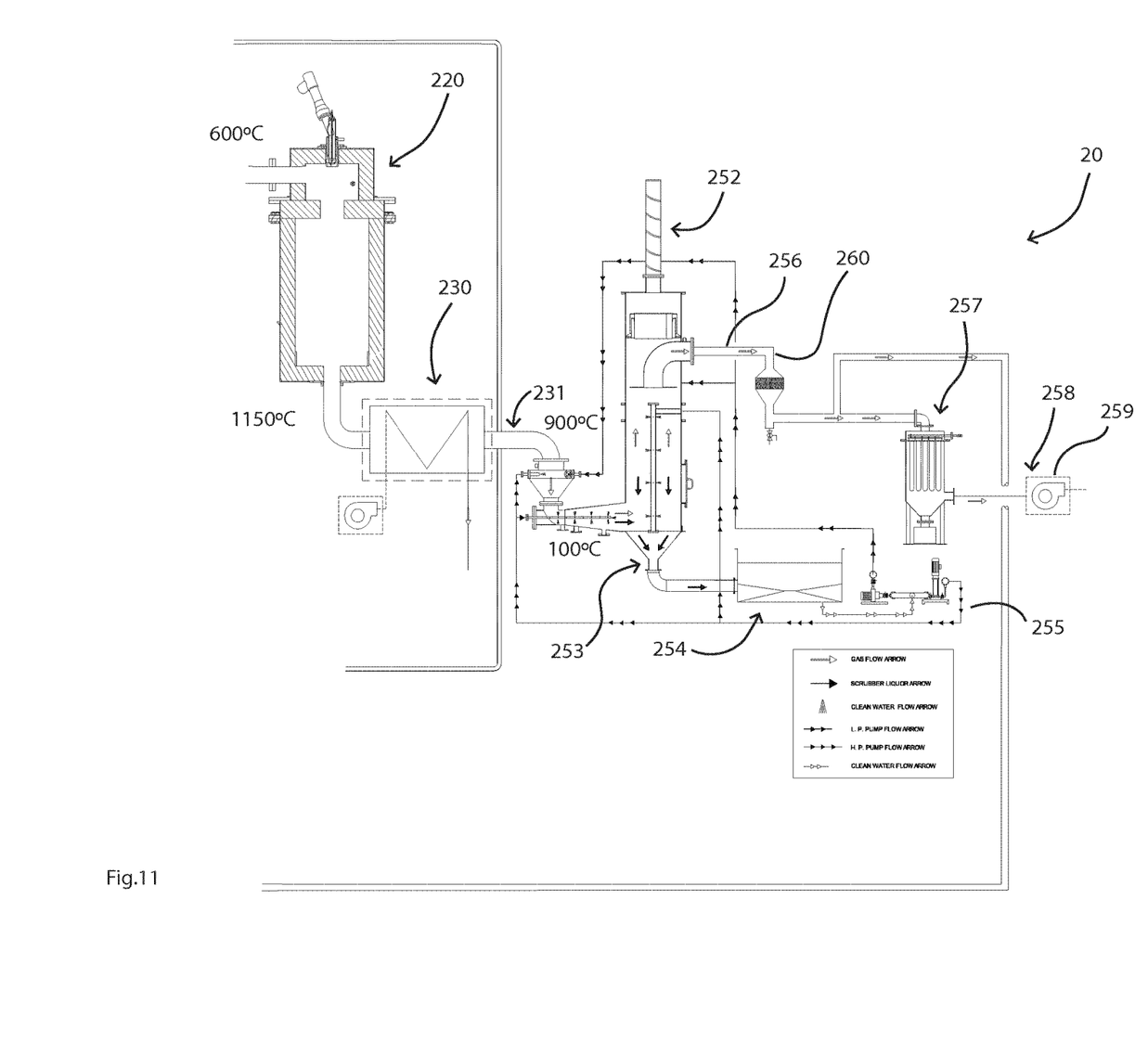
FIG. 11 is a diagram showing down-stream components including gas cleaning apparatus.

Referring to FIG. 11 the gases (syngas) cleaning system 20 is arranged to receive syngas arising from pyrolysis of the biomass feedstock, such as municipal solid waste (MSW).

The gases (syngas) treatment system 20 comprises a cracking tower 220 which directly receives the syngas from the pyrolysis retort 4 or 150. The tower 220 feeds gases (syngas) with smaller molecular chains to a heat exchanger 230 for reduction of temperature, and this in turn feeds the gases to a quench device 231 having a Venturi-like throat for further reduction to meet engine specified temperature ranges. The tower may be horizontally arranged rather than vertical, its orientation not being important.

The gas cracking tower 250 preferably has a length of 2 m to 8 m, and more preferably 5 m to 8 m, and a diameter in the range of 1 m to 2 m, and is designed and manufactured to retain high operating temperatures. It provides a temperature in the range of 850° C. to 1250° C. to create a syngas with a composition of methane, hydrogen, and carbon monoxide along with other trace gases.

The quench device 231 effectively stops the pyrolysis completely and feeds the gases (syngas) into a scrubber tower 252, from which scrubber liquor is delivered by a sump 253 to a water tank 254. High pressure pumps 255 are arranged to deliver the water to the quench device 231.

The gas at entry to the cracking tower 220 may be at approximately 600° C.+/−50° C., and due to residence in the tower 220 this rises to a value in the range of 850° C. to 1250° C. It is cooled to about 900° C. (for a level of 1150° C.) by the heat exchanger 230, and the quenching system 231 drops it down to about 100° C.

The gases (syngas) flow upwardly through the scrubber tower 252 and thence through an outlet 256. A portion of the gases (syngas) at this stage is diverted for pyrolysis retort heating, and the main portion is routed to a demister unit 260 and filter unit 257 which provides the output product, cleaned syngas, at an outlet 258. This includes a pump 259 for both delivering the output syngas as a fuel product, but also to maintain pressure in the overall system.

The filter system 257 has a flare to ensure safe process operation. It disposes of purged, non-condensable, vented and unused gases from the pyrolysis unit. The flare provides a mechanism for safe disposal of the vapour streams by combustion under controlled conditions.

Advantageously, the pump 259 is managed by a programmed controller with digital processors which receives pressure-sensing signals from various parts of the system, including the retort 4, the gas outlet 15, and the cracking tower 220. This is to allow pressure control to ensure that the pressure generated in the retort 4 by conversion of solid mass feedstock to gas is capped at a level which does not become excessive, and is preferably in the range of −20 mBar to +20 mBar within the rotating retort 4, and more preferably −5 mBar to 0 mBar.

Advantageously, this also controls the residence time in the cracking tower 220, to a value in the range of 1 second to 4 seconds. In these ranges, the pressure control helps to ensure the appropriate residence time in the cracking tower 220. This achieves optimum time for breakdown of the gases to shorter chains with a temperature in the region of 850° C. to 1250° C. maintained. The cracking tower 220 is preheated and maintained at the optimum temperature using pressure and temperature control parameters, and ensures that the syngas distribution and rates of reaction are appropriate given the type of syngas that is presented from the retort.

The booster fan 259 chambers are cast in aluminum alloy and manufactured to eliminate porosity. Impellers are also cast in aluminum and are dynamically balanced to cut down noise and vibration. Booster fan bearing housings are manufactured in cast iron for mechanical stability and each fan chamber assembly is sealed for gas tightness.

Figure 12:
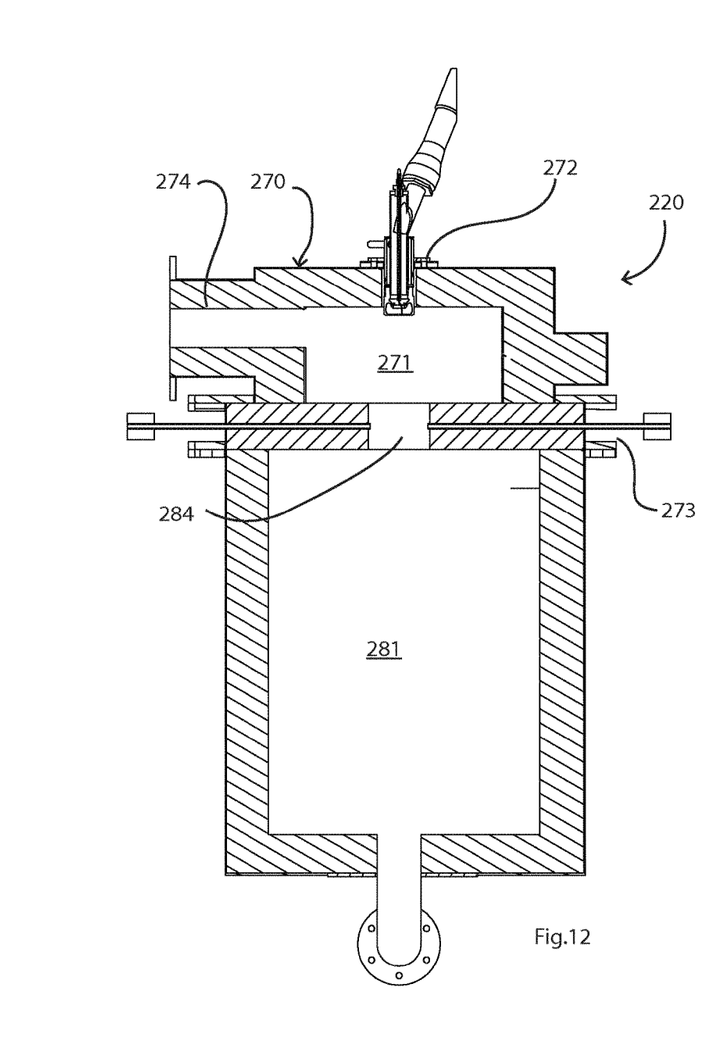
FIGS. 12 and 13 are cross-sectional and cut-away perspective views of a cracking tower of this part of the system.
Figure 13:
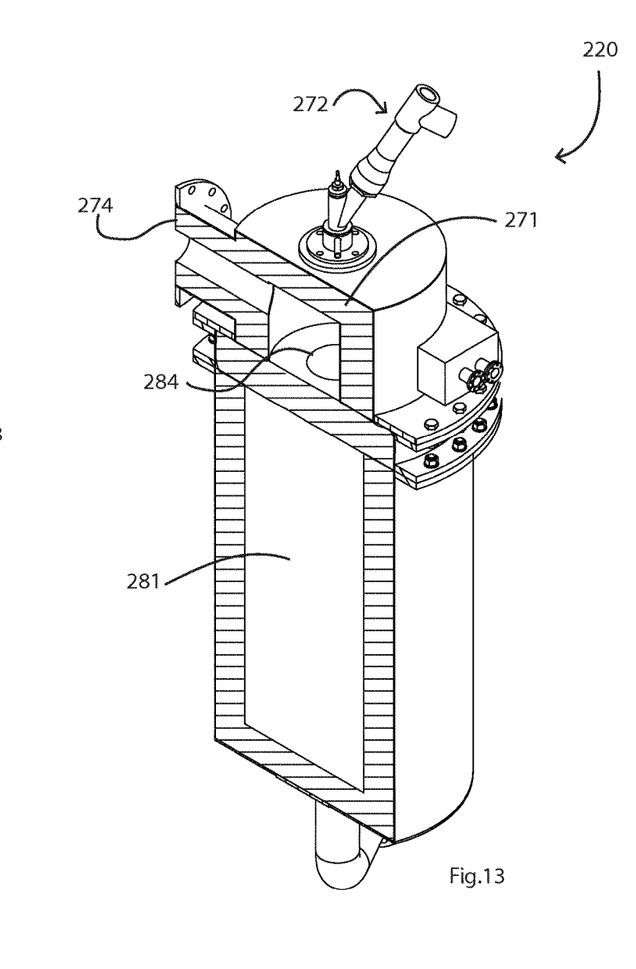

Referring to FIGS. 12 and 13 the tower 220 comprises a combustion chamber 270 having a volume 271 into which extends a pilot burner 272 and an air manifold with multiple injection points 273. The syngas is received via a flanged inlet 274.

The cracking tower 220 is manufactured with a 3 mm rolled mild steel outer housing lined with high grade refractory. The inlet ducting from the hot char recovery hopper to the cracking tower 220 and the outlet ducting from the cracking tower 220 to the scrubber tower 252 are also lined with high grade refractory. Refractory lining consists of either Arelcrete refractory or a combination of Arelcrete refractory and calcium silicate board.

The gases (syngas) from the combustion chamber 270 are then drawn through a residence chamber 281.

The pilot burner 272 provides a plume which extends through the combustion chamber 270 towards a choke ring aperture 284. This flame heats the combustion chamber 270 volume 271 and the residence chamber 281 to a temperature in the range of 850° C. to 1250° C.

The tangential flow of the inlet syngas into the gas cracking tower 250 preferably has a length of 2 m to 8 m, and more preferably 5 m to 8 m, and a diameter in the range of 1 m to 2 m, and is designed and manufactured to retain high operating temperatures. It provides a temperature in the range of 850° C. to 1250° C. to create a syngas with a composition of methane, hydrogen, and carbon monoxide along with other trace gases. The combustion chamber 270 oxidises some of the syngas, thereby losing a small percentage, circa 5%, of the syngas in order to sustain thermal energy requirements of the residence chamber 281.

The heat level within the residence chamber 281 causes long chain hydrocarbons, in the form of pyrolysis tars and oils to break into shorter chain hydrocarbon gases (syngas), thus eliminating oils and tars.

The injection of air from the manifold at the injection nozzles 273 into the combustion chamber 270 to allow sub-stoichiometric conditions gives the effects of:
  breaking the long chains hydrocarbons,
  increasing $H_2$ and CO components while reducing CH4 (methane),
  increasing some Carbon, as soot.

The syngas which leaves the residence chamber 281 is fed into the scrubber tower 252 at an inlet 290 of a hot syngas quench unit 231 via the heat exchanger 230 (or boiler arrangement).

Figure 14:
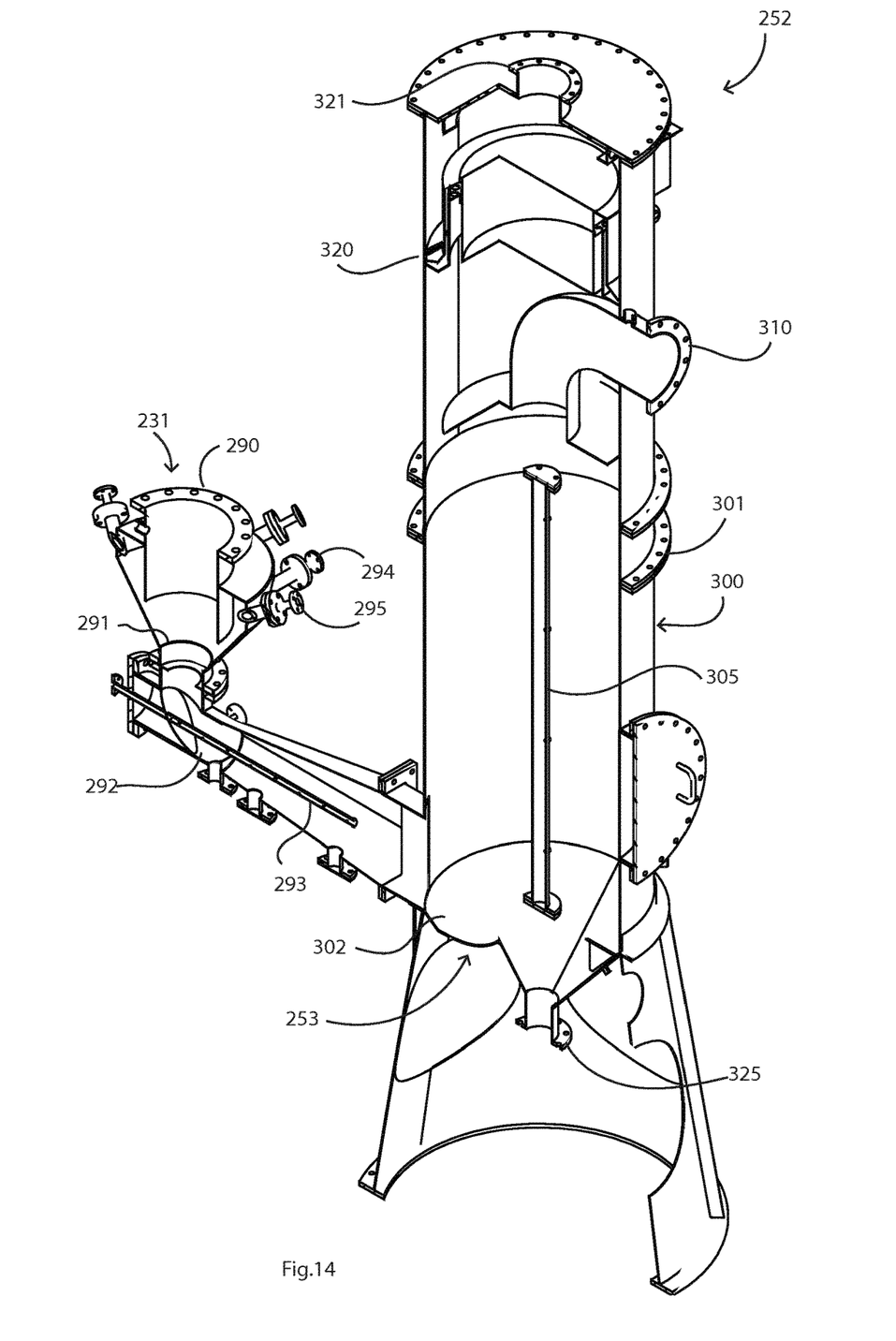
FIG. 14 is a cut-away perspective view of a scrubber tower.

Referring also to FIG. 14 the hot syngas travels through a Venturi quench throat 291 and on into a conduit 292. There is a set of four to eight low pressure cyclonic spray nozzles 294 and a set of four to eight high pressure cyclonic spray nozzles 295 around the quench inlet 291. Further quench water is provided by a high pressure spray bar 293 along the centre of the conduit 292.

Quenched syngas from the conduit 292 enters the scrubber tower 252, which has a tubular housing 300 with flanges 301 joining tubular sections. A spray bar 305 extends up through the centre of the scrubber tower 252 for further gas quenching. Syngas exits through an outlet 310, and water drops to a sump 302 having an outlet port 325.

Referring again to FIG. 11, the water is pumped to the tank 254, and water is drawn from the tank 254 by the pumps 255 to be fed back to the scrubber tower 252.

The scrubber outlet syngas is fed through the demister 256 and the filter unit 257, and from there to the clean gas outlet 258.

The major components removed from the syngas by the scrubber tower 252 are water soluble contaminants. There may be pH adjustment in the tank 254 by addition of a neutralizing agent.

Use of System

Char consists of carbon and ash, commonly called "charcoal" or "biochar". Within the retort drum 4 a thermochemical fuel cracking process takes place that generates a syngas incorporating the reforming of hydrocarbons, and also produces char (carbon and ash). Any inert material that may be embedded in the fuel will remain with the char. The stainless steel char recovery hopper, sufficiently lagged with insulating material to maintain high temperature in this vessel, allows for the solid residues to be gravitationally separated from the gaseous residues. The newly-formed hot char deposits on the bottom of the vessel where a cooling jacketed extract auger facilitates removal and deposition of hot char into a char recovery storage vessel.

Simultaneously, syngas is removed through the top of the vessel where temperatures remain high. This syngas is subsequently ducted into the gas cracking tower 220, with a bypass spur to the gas vent valve, to crack pyrolysis tars and oils entrained in the syngas stream into shorter chain hydrocarbon gases. In this application, where the focus is upon syngas, pyrolysis tars and oils are viewed as contaminants.

The rotating retort drum 4 preferably operates at a temperature of about 850° C.±100° C. whereby a thermochemical reaction takes place called "cracking" of hydrocarbons. The solid materials are converted into gases, oils and char. Given the operating temperatures, the gases are reformed into short hydrocarbon chain gases, with release of chlorine, sulphur and other contaminants that turn gaseous below about 900° C. As no oxygen is present in the reactor 4 no combustion takes place and dioxins and furans cannot be formed at detectable levels.

The computerised control system manages the operating parameters including the temperature, pressures and level control within this oxygen-free environment.

Consequently, the quality of syngas being generated remains consistently high. The syngas produced in the pyrolysis retort 4 is a mixture of light gases, heavier gases and condensable organics. The light gases, which comprise the main fraction, include hydrogen, carbon monoxide, carbon dioxide, methane and ethane and similar short chain hydrocarbons.

Important parameters that determine the maximisation of syngas output are as follows:
  Feed rate
  Feed particle size
  Retort temperature
  Retort rotation speed
  Moisture content As shown in FIGS. 3 to 5, the rotating retort drum 4 vanes progressively advance the feedstock as the drum 4 rotates. This ensures maximum fuel residence time, uniform radial constant heat exposure and minimal shell stress while the fuel is converted into two products: a syngas and, char (charcoal) at an optimum rate. The outer shell 60 of the rotating retort drum 4 has a corrugated profile which maximizes heat absorbing surface area by increasing it in excess of 50%. The corrugations allow the wall thickness of the shell to be reduced without compromising the vessel's structural integrity. In addition, the vane 61 arrangement encourages agitation of the feedstock within the vessel as it rotates and progressively advances towards the back-end extraction point.

The hot flue exhaust gases delivered by the conduit 12(*a*) heat the rotating retort drum 4 on all surfaces, which then radiates towards the centre of the chamber, imparting its heat to the feedstock. The pyrolysis chamber 4 and the complete gas circuit can be injected with nitrogen in the event of it being necessary to purge out syngas or air.

A gas venting system at the outlet of the rotating retort drum 4 releases syngas to atmosphere in the event of system overpressure. The gas pressure in the rotating retort drum 4 is controlled by the gas booster fan 259, which either increases velocity to reduce pressure or reduces velocity to increase pressure within a defined operational range. Fuel is thermally decomposed into a carbon monoxide, carbon dioxide, methane and hydrogen gas stream called syngas. Another output from the thermal conversion process is the carbon char fraction of the feedstock. This product will be cooled and temporarily stored prior to further analysis or treatment.

The rotating retort drum 4 inlet and outlet stub pipes 65 and 66 extend from the dished ends of the rotating retort drum. Trunnion wheels 101 and 120 are mounted to each of the stub pipes 65 and 66 respectively, which in turn sit on rollers fixed to cradles. The rollers and trunnion wheels are manufactured to assist ease of retort drum rotation while allowing for expansion of the vessel, at its extract end, during normal operating conditions.

The drive mechanism 100 ensures consistent rotational speed of the rotating retort drum 4 which determines the residence time for the feedstock to be exposed to the thermal cracking atmosphere as it is progressed through the drum by the vanes 61. The drive mechanism 100 overcomes the torque threshold of the gas seals and friction associated with the rollers.

The solid char and syngas extraction system 15 includes an out-feed spigot, expansion bellows 106 and 122, stainless steel out-feed scroll 131 and a gas seal rotary housing with integrated bearing assembly which is water cooled. This system is flanged to the rotating retort drum and the stainless steel char recovery hopper.

The out-feed scroll 131 has a mounted variable speed drive 140 which controls char extraction from the rotating retort drum. The scroll 131 extracts this pyrolysed material through the central axis of the out-feed spigot 130 and the solid char is deposited into the stainless steel char recovery vessel 16, whilst syngas is extracted under negative pressure and ducted via the tube 51 into the gas cracking tower 220.

The two bellows pieces 106 and 122 accommodate thermal expansion of the rotating retort drum 4.

The newly formed hot char that has been extracted from the rotating retort drum 4 is directed into the inlet of the inclined char cooling extract auger 41 located at the base of the stainless steel char recovery hopper 16. The auger 41 consists of a water-jacketed outer body that is inclined at an angle to ensure full occupancy of the auger diameter to maximize cooling potential and deliver a gas seal. The exit of the auger has two interlocking gate valves to ensure a gas seal is maintained and are of similar design to the front-end interlocking valves. Both gates valves are horizontally mounted and sequentially controlled whereby only one valve is open at any given time. These gates valves can be exchanged for rotary valve depending on material types and its ability to flow through the valve body.

The water-cooled propane heating lance 272 enables initial heating of the cracking tower in the chamber 270. The air manifold and nozzles 273 are utilized to increase the temperature of the incoming syngas from circa 500° C. to a value in the range of 850° C. 1250° C.

The major advantages of the cracking tower 220 are that a residence time, in the range of 1 to 4 seconds is achieved, sufficient for long hydrocarbon chains to be converted to shorter chains whilst avoiding the carryover of tar.

High efficiency hot gas filtration incorporating ceramic filters 257 is an important aspect in the gas conditioning process. Subject to feedstock composition and process parameters, the pyrolysis conversion process produces a wide range of particulate emissions which are particularly suited to capture by means of filtration. Traditional bag filters are largely unsuitable for the process because of their poor thermal durability and inherent flammability whereas ceramic filters typically operate at higher temperatures and have greater face velocities than bag filters.

The filtration system 257 operates as follows:
Ceramic filter elements hang vertically from a filter plate within the steel enclosure. The header plate separates the filter's clean and dirty compartments.
Hot syngas is drawn through the ceramic filter elements from outside to inside.
Particulate matter is collected on the outer surface of each ceramic filter.
The particles are removed from the ceramic filter element by a reverse jet pulse. This reversal causes the accumulated solids to be detached from the outer surface of the ceramic filter elements.
The particulate matter is discharged through the hopper outlet for collection and disposal.

A gas booster selection is primarily based upon pressure lift requirements and volumetric displacement. The preferred fan selection was for a centrifugal fan design that can deliver high performance from a small physical size.

The invention is not limited to the embodiments described but may be varied in construction and detail. For example, the system may be arranged to treat gases from any process, not necessarily syngas.

Overall, it has been found that the method of pyrolising in the retort, jointly outputting char and gas, and treating the gas by heating for a residence time, followed by quenching is a very effective way of achieving good quality syngas without tars or undesired long molecular chains.

The invention is not limited to the embodiments described but may be varied in construction and detail. For example, the cracking tower may include media to provide an obstructed path through the tower as an aid to control residence time, and such media may include a catalytic coating. Also, the invention may take the form of the cracking tower and associated control method, arranged to take a feed of gas from any other pyrolysis system.

The invention claimed is:
1. A pyrolysis conversion system comprising:
a muffle furnace having an inlet end and an outlet end,
a rotating retort drum within the furnace, said rotating retort drum comprising:
an inlet sleeve extending through the inlet end of the muffle furnace;
an outlet sleeve extending through the outlet end of the muffle furnace,
a rotating retort drum drive applying rotary drive to at least one of said inlet rotating retort drum sleeve and said outlet rotating retort drum sleeve,
an in-feed auger within a tube within the rotating retort drum inlet sleeve,
an out-feed auger within a tube within the rotating retort drum outlet sleeve and arranged to deliver syngas and char from said rotating retort drum,
a char processing system arranged to receive said char,
a syngas processing system arranged to receive said syngas, and comprising a cracking tower to retain said received syngas at an elevated temperature for a residence time, and
a gas quench and scrubber system, and
wherein:
said inlet sleeve is arranged to provide a gas seal to prevent air ingress or syngas egress to and from the rotating retort drum, the rotating retort drum has auger scroll blades fixed to the rotating retort drum wall for conveying feedstock along the drum towards the outlet, the rotating retort drum comprises scroll blades of opposite direction for reversal of char movement from an end of the drum and into the outlet auger, the rotating retort drum comprises at least one pick-up scoop, the rotating retort drum comprises longitudinally-separated barriers between which are radial char retainers for delivery of char into an outlet auger, the out-feed auger tube has a char outlet opening on its lower side, which allows char and solid particulate to fall and occupy a lower part of an out-feed hopper, and in which syngas occupies any free volume remaining in the hopper, and the pyrolysis conversion system comprises a syngas extraction system arranged to extract syngas from the hopper under negative pressure.

2. The pyrolysis conversion system as claimed in claim 1, wherein the cracking tower comprises a mixing chamber and a residence chamber, and said mixing chamber is linked with and upstream of the residence chamber.

3. The pyrolysis conversion as claimed in claim 1, wherein the cracking tower comprises a mixing chamber and a residence chamber, and said mixing chamber is linked with and upstream of the residence chamber; and wherein the mixing chamber comprises a burner for heat generation and an oxidant port arranged to mix and partially consume a portion of the gas as it passes through the mixing chamber.

4. The pyrolysis conversion system as claimed in claim 1, wherein the cracking tower comprises a mixing chamber and a residence chamber, and said mixing chamber is linked with and upstream of the residence chamber; and wherein the mixing chamber is linked to the residence chamber by a choke ring having a central aperture, and the burner is configured to direct a flame through the mixing chamber and into the choke ring aperture.

5. The pyrolysis conversion system as claimed in claim 1, wherein the cracking tower comprises a mixing chamber and a residence chamber, and said mixing chamber is linked with and upstream of the residence chamber; and wherein the mixing chamber gas inlet is tangential into the chamber.

6. The pyrolysis conversion system as claimed in claim 1, wherein the cracking tower comprises a mixing chamber and a residence chamber, and said mixing chamber is linked with and upstream of the residence chamber; and wherein the residence chamber has a length in the range of 2 m to 8 m, and a lateral dimension in the range of 1 m to 2 m.

7. The pyrolysis conversion system as claimed in claim 1, wherein the gas quench and scrubber system comprises a Venturi quench throat and cyclonic spray nozzles; and wherein the nozzles comprise low pressure nozzles and high pressure nozzles; and wherein the nozzles are cyclonic nozzles.

8. The pyrolysis conversion system as claimed in claim 1, wherein the scrubber system comprises a spray bar within a conduit; and wherein the gas quench and scrubber system comprises a tank and a pump for drawing liquid from a sump of a scrubber column; and wherein the pyrolysis conversion system comprises a conduit for delivering a portion of the cleaned gas to nozzles for heating the rotating drum.

9. The pyrolysis conversion system as claimed in claim 1, comprising a rotary drive for the inlet sleeve; and wherein the rotating retort drum drive comprises a rotary bearing adjacent the muffle furnace and a gear drive at a location further from the muffle furnace; and wherein the in-feed auger tub is surrounded by a cooling jacket for at least some of its length; and wherein the cooling jacket comprises an expansion bellows arranged to accommodate mutual axial expansion and contraction between the rotating retort drum when rotating and stationary parts of the in-feed auger.

10. The pyrolysis conversion system as claimed in claim 1, further comprising a hopper mounted over the in-feed auger and extending through an upper opening in the in-feed auger tube; and wherein said hopper is arranged to block a potential syngas escape path while the hopper is full.

11. The pyrolysis conversion system as claimed in claim 1, wherein the out-feed auger is surrounded by a tube having an opening over a hopper for char gravity fall, and an opening for a syngas flow path into an upper conduit for delivery of syngas to syngas processing system.

12. The pyrolysis conversion system as claimed in claim 1, further comprising a syngas burner within the muffle furnace for heating an annular space around the rotating retort drum, and a feedback link for directing syngas from the rotating retort drum back to said burner.

13. The pyrolysis conversion system as claimed in claim 1, further comprising a pump downstream of the gas cleaning system, and a controller to control the pump according to pressure-sensing signals from within the retort and the cracking tower to ensure that pressure generated in the retort by conversion of solid mass feedstock to gas is capped at a level which does not become excessive and also controls the residence time in the cracking tower; and wherein the controller is configured to control said pump to provide a cracking tower residence time in the range of 1 second to 4 seconds.

14. A pyrolysis conversion method performed by a conversion system comprising:

a muffle furnace having an inlet end and an outlet end, a rotating retort drum within the furnace, said rotating retort drum comprising:

an inlet sleeve extending through the inlet end of the muffle furnace;

an outlet sleeve extending through the outlet end of the muffle furnace, a rotating retort drum drive applying rotary drive to at least one of said inlet rotating retort drum sleeve and said outlet rotating retort drum sleeve, an in-feed auger within a tube within the rotating retort drum inlet sleeve, an out-feed auger within a tube within the rotating retort drum outlet sleeve and arranged to deliver syngas and char from said rotating retort drum, a char processing system arranged to receive said char, a syngas processing system arranged to receive said syngas, and comprising a cracking tower to retain said received syngas at an elevated temperature for a residence time, and a gas quench and scrubber system, and wherein:

said inlet sleeve is arranged to provide a gas seal to prevent air ingress or syngas egress to and from the rotating retort drum, the rotating retort drum has auger scroll blades fixed to the rotating retort drum wall for conveying feedstock along the drum towards the outlet, the rotating retort drum comprises scroll blades of opposite direction for reversal of char movement from an end of the drum and into the outlet auger, the rotating retort drum comprises at least one pick-up scoop, the rotating retort drum comprises longitudinally-separated barriers between which are radial char retainers for delivery of char into an outlet auger, the out-feed auger tube has a char outlet opening on its lower side, which allows char and solid particulate to fall and occupy a lower part of an out-feed hopper, and in which syngas occupies any free volume remaining in the hopper, and the pyrolysis conversion system comprises a syngas extraction system arranged to extract syngas from the hopper under negative pressure;

wherein the method comprises feeding feedstock into the retort drum via the inlet sleeve in-feed auger, rotating the retort drum and heating it within the muffle furnace so that the feedstock is pyrolyzed within the retort drum, feeding char and gas out through the out-feed auger, and cracking the gas in the cracking tower.

15. The method as claimed in claim 14, wherein the gas is heated in the cracking tower to a temperature in the range of 850° C. to 1250° C., and is subsequently cooled by the gas quench and scrubber system, wherein the feedstock is heated in the retort drum at a temperature in the range of 550° C. and 700° C., and wherein the residence time within the cracking tower is in the range of 1 sec to 4 sec.

16. The method as claimed in claim 14, wherein the cracking tower residence time is controlled by control of a gas pump downstream of the cracking tower, and wherein the pressure within the retort drum is maintained at a value in the range of −10 mBar to +10 mBar, and wherein said retort drum pressure is controlled by control of a gal pump downstream of the cracking tower.

* * * * *